United States Patent

Sugaya

(10) Patent No.: US 10,819,699 B2
(45) Date of Patent: Oct. 27, 2020

(54) SYSTEM, METHOD, AND PROGRAM FOR REMOTELY SUPPORTING WORK

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 15/749,880

(22) PCT Filed: Mar. 30, 2017

(86) PCT No.: PCT/JP2017/013256
§ 371 (c)(1),
(2) Date: Feb. 2, 2018

(87) PCT Pub. No.: WO2018/179223
PCT Pub. Date: Oct. 4, 2018

(65) Prior Publication Data
US 2020/0028839 A1    Jan. 23, 2020

(51) Int. Cl.
H04L 29/06    (2006.01)
G06F 3/14    (2006.01)
G06K 9/62    (2006.01)

(52) U.S. Cl.
CPC .......... *H04L 63/083* (2013.01); *G06F 3/1454* (2013.01); *G06K 9/6256* (2013.01); *H04L 63/0853* (2013.01); *G06K 2209/01* (2013.01)

(58) Field of Classification Search
CPC . H04L 63/083; H04L 63/0853; G06F 3/1454; G06K 9/6256; G06K 2209/01
See application file for complete search history.

(56) References Cited

U.S. PATENT DOCUMENTS 6,311,214 B1* 10/2001 Rhoads ............... G06F 21/36
709/217
6,735,347 B1* 5/2004 Bates .................. G06F 17/24
358/405

(Continued)

FOREIGN PATENT DOCUMENTS

JP    2013-061940    4/2013
JP    2014-197745    10/2014

(Continued)

OTHER PUBLICATIONS

Search Query Report from IP.com (performed Mar. 10, 2020).*
Search Query Report from Ip.com (performed Jul. 11, 2020) (Year: 2020).*

*Primary Examiner* — Sharon S Lynch
(74) *Attorney, Agent, or Firm* — Lex IP Meister, PLLC

(57) ABSTRACT

A system for remotely supporting work, in which an image taken by a user terminal is shared between the user terminal and a terminal for remotely instructing work to remotely support work, includes: a detection unit that detects an ID or a password contained in the image; a processing unit that processes the image to make the ID and the password invisible if an ID or a password is detected; a display unit that displays the processed image on the terminal for remotely instructing work; and a receiving unit that receives a remote work instruction for the displayed processed image from the terminal for remotely instructing work.

5 Claims, 1 Drawing Sheet

(56) References Cited

U.S. PATENT DOCUMENTS

| | | | | |
|---|---|---|---|---|
| 6,823,203 B2* | 11/2004 | Jordan | H04N 1/38 | 128/920 |
| 7,149,353 B2* | 12/2006 | Siegel | G06F 16/9535 | 382/190 |
| 7,162,068 B2* | 1/2007 | Akagi | A61B 6/4216 | 382/132 |
| 7,627,152 B2* | 12/2009 | Mathew | G06T 5/005 | 382/128 |
| 8,010,632 B2* | 8/2011 | Rhoads | G06F 21/36 | 709/219 |
| 8,612,854 B2* | 12/2013 | Eisen | H04N 1/32229 | 715/271 |
| 8,863,008 B2* | 10/2014 | Chan | G06F 21/84 | 715/751 |
| 8,879,846 B2* | 11/2014 | Amtrup | G06K 9/00442 | 382/190 |
| 9,069,973 B2 | 6/2015 | Palanichamy | G06F 21/6209 | |
| 9,111,181 B2 | 8/2015 | Allen | G06K 9/00221 | |
| 9,141,332 B2 | 9/2015 | Coleman | G06F 21/55 | |
| 9,361,469 B2 | 6/2016 | Thiyagarajan | G06F 3/1454 | |
| 9,514,333 B1* | 12/2016 | Patel | H04L 63/0428 | |
| 9,699,271 B2 | 7/2017 | Brander | H04L 67/36 | |
| 9,760,797 B2 | 9/2017 | Feng | G06K 9/6202 | |
| 9,773,195 B2 | 9/2017 | Feris | G06K 9/6269 | |
| 10,402,590 B2* | 9/2019 | Rai | G06F 21/6254 | |
| 10,586,071 B2* | 3/2020 | Kochura | G06F 21/6245 | |
| 2002/0188187 A1* | 12/2002 | Jordan | H04N 1/38 | 600/407 |
| 2005/0063615 A1* | 3/2005 | Siegel | G06F 16/9535 | 382/309 |
| 2005/0111762 A1* | 5/2005 | Mathew | G06T 11/60 | 382/309 |
| 2007/0183000 A1* | 8/2007 | Eisen | H04N 1/00872 | 358/452 |
| 2011/0202850 A1* | 8/2011 | Chan | G06F 21/606 | 715/745 |
| 2012/0036452 A1* | 2/2012 | Coleman | G06F 21/55 | 715/751 |
| 2012/0210243 A1* | 8/2012 | Uhma | G06F 16/972 | 715/744 |
| 2013/0063478 A1* | 3/2013 | Seo | G06F 3/0488 | 345/619 |
| 2013/0263288 A1* | 10/2013 | Palanichamy | G06F 3/1454 | 726/30 |
| 2014/0215356 A1* | 7/2014 | Brander | H04L 67/36 | 715/753 |
| 2014/0355069 A1* | 12/2014 | Caton | H04N 1/0087 | 358/3.28 |
| 2015/0278534 A1* | 10/2015 | Thiyagarajan | G06F 21/84 | 726/28 |
| 2015/0296170 A1* | 10/2015 | Farrell | H04N 5/913 | 386/254 |
| 2015/0339526 A1* | 11/2015 | Macciola | G06K 9/00442 | 382/195 |
| 2015/0371399 A1* | 12/2015 | Tonouchi | G06T 7/11 | 382/176 |
| 2016/0037057 A1* | 2/2016 | Westin | H04N 5/23222 | 348/207.1 |
| 2016/0055393 A1* | 2/2016 | Feng | G06K 9/6202 | 382/199 |
| 2016/0294781 A1* | 10/2016 | Ninan | H04L 63/0407 | |
| 2017/0063773 A1* | 3/2017 | Doherty | H04L 51/10 | |
| 2017/0076114 A1* | 3/2017 | Rai | G06F 21/6254 | |

FOREIGN PATENT DOCUMENTS

| | | |
|---|---|---|
| JP | 2015-143899 | 8/2015 |
| JP | 2016-004553 | 1/2016 |

* cited by examiner

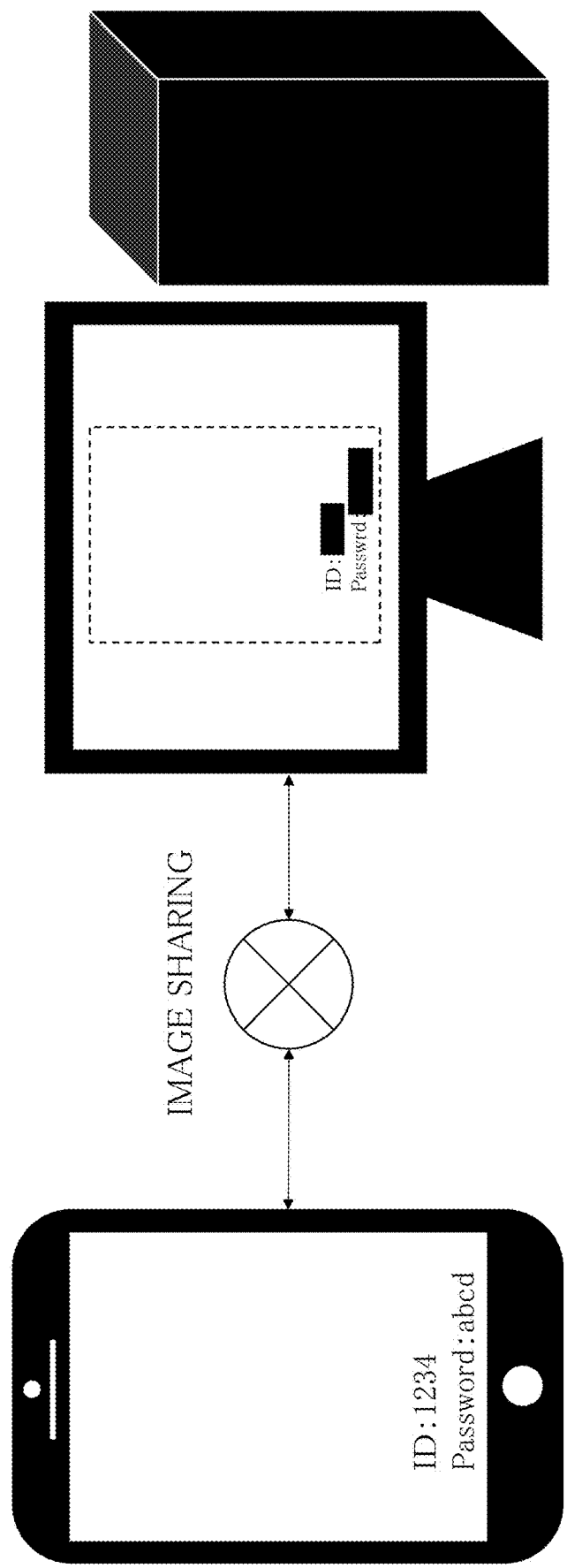

SYSTEM, METHOD, AND PROGRAM FOR REMOTELY SUPPORTING WORK

TECHNICAL FIELD

The present invention relates to a system, method, and program for remotely supporting work, in which an image taken by a user terminal is shared between the user terminal and a terminal for remotely instructing work to remotely support work.

BACKGROUND ART

Recently, there has been a problem, for example, shortage of manpower. As one of the solutions, there is a remote work support system in which an expert worker can remotely instruct work to a new worker in a remote place. For example, a remote work support system is proposed, in which an image and pointer information with the correctly adjusted coordinate can be shared among a plurality of mobile terminals, an instructor can intuitively instruct work, and a worker can visually recognize the work instruction adequately (Patent Document 1).

CITATION LIST

Patent Literature

Patent Document 1: JP 2014-197745A

SUMMARY OF INVENTION

However, the system of Patent Document 1 has a problem where even an image containing confidential information is shared.

In view of the above-mentioned problems, an objective of the present invention is to provide a system, method, and program for remotely supporting work, in which the image is displayed on the terminal for remotely instructing work after processed to make the ID or the password invisible when an image taken by a user terminal is shared between the user terminal and a terminal for remotely instructing work to remotely support work.

The first aspect of the present invention provides a system for remotely supporting work, in which an image taken by a user terminal is shared between the user terminal and a terminal for remotely instructing work to remotely support work, including:

a detection unit that detects an ID or a password contained in the image;

a processing unit that processes the image to make the ID and the password invisible if an ID or a password is detected;

a display unit that displays the processed image on the terminal for remotely instructing work; and a receiving unit that receives a remote work instruction for the displayed processed image from the terminal for remotely instructing work.

The first aspect of the present invention provides a method for remotely supporting work, in which an image taken by a user terminal is shared between the user terminal and a terminal for remotely instructing work to remotely support work, including the steps of:

detecting an ID or a password contained in the image;

processing the image to make the ID or the password invisible if an ID or a password is detected;

displaying the processed image on the terminal for remotely instructing work; and receiving a remote work instruction for the displayed processed image from the terminal for remotely instructing work.

The first aspect of the present invention provides a program for causing a computer to share an image taken by a user terminal between the user terminal and a terminal for remotely instructing work to remotely support work, including the steps of:

detecting an ID or a password contained in the image;

processing the image to make the ID or the password invisible if an ID or a password is detected;

displaying the processed image on the terminal for remotely instructing work; and receiving a remote work instruction for the displayed processed image from the terminal for remotely instructing work.

According to the present invention, even if the image contains an ID or a password when an image taken by a user terminal is shared between the user terminal and a terminal for remotely instructing work to remotely support work, the terminal for remotely instructing work can display the image without showing an ID or a password.

BRIEF DESCRIPTION OF DRAWINGS

FIG. 1 shows one sample of display not showing the ID or the password on the terminal for remotely instructing work.

DESCRIPTION OF EMBODIMENTS

Embodiments of the present invention will be described below. However, this is illustrative only, and the technological scope of the present invention is not limited thereto.

The system for remotely supporting work of the present invention displays the image on a terminal for remotely instructing work after processed to make an ID or a password invisible when the image shared between a user terminal and the terminal for remotely instructing work contains an ID or a password. The user is one who receives a remote work instruction from a remote work instructor who remotely instructs work. The user terminal is at least provided with an imaging unit such as a camera. The image may be a moving image and a still image.

A preferable embodiment of the present invention will be described below with reference to FIG. 1. FIG. 1 shows one sample of display not showing the ID or the password on the terminal for remotely instructing work according to a preferable embodiment of the present invention.

The system for remotely supporting work includes a detection unit, a processing unit, a display unit, and a receiving unit that the control unit achieves by reading a predetermined program. These units may be of an application type, a cloud type, or the like. The above-mentioned units may each be achieved by a single computer or two or more computers (e.g., a server and a terminal).

The detection unit detects an ID or a password contained in the image when an image taken by a user terminal is shared between the user terminal and a terminal for remotely instructing work to remotely support work. To detect an ID or a password contained in the image, optical character recognition (hereinafter referred to as "OCR") may be used. Alternatively, the IDs or passwords detected in the past may be mechanically learned as teacher data to detect an ID or a password contained in the image. The machine learning improves the accuracy of detection.

The processing unit processes the image to make the ID or the password invisible if an ID or a password is detected. For example, the processing means tessellating, blackening, or masking the image with a stamp.

The processing unit may specify the position displaying the ID or the password contained in the image and may process only the part of the image that corresponds to the position to make the ID or the password invisible, if an ID or a password is detected. Specifically, since only the part of the ID or the password is made invisible but the other parts are visible, it is easier to remotely instruct work than if the entire image is made invisible. Furthermore, since the parts other than the ID or the password are visible, the situation can be known to remotely instruct work easily. For example, only the part of the ID or the password is made invisible as shown in FIG. 1. The character string "ID" or "password" may also be made invisible at the same time.

Alternatively, the processing unit may not specify the position displaying the ID or the password contained in the image and may process the entire image to make the ID or the password invisible, if an ID or a password is detected. In this case, since the entire image is invisible, the security can be more tightened than the case where only the part of the ID or the password is invisible, even if the processing partly fails. Furthermore, even if the position of the ID or the password is failed to be specified, the leak of information is prevented because the entire image is invisible.

The display unit displays the processed image on the terminal for remotely instructing work. The display unit may display that the image has been processed. This enables a remote work instructor who uses the terminal for remotely instructing work to recognize that the displayed image has been processed. As the result, the remote work instructor easily remotely instructs work. Furthermore, if the aspect ratio of the screen of the user terminal is different from that of the terminal for remotely instructing work as shown in FIG. 1, the image may be displayed on the terminal for remotely instructing work to maintain the aspect ratio of the image taken by the user terminal (for example, by displaying the part enclosed with a broken line on the terminal for remotely instructing work as shown in FIG. 1).

The receiving unit receives a remote work instruction for the displayed processed image from the terminal for remotely instructing work. The remote work instructor can input a remote work instruction for the user from the terminal for remotely instructing work to the user terminal. The remote work instruction is necessary for work from a remote place, for example, by drawing and displaying a red circle in the image to tell the machine to be operated, by displaying a cubic arrow icon to tell the correct imaging direction, or appropriately changing and displaying to tell the progress of work.

The receiving unit receives a remote work instruction for the part other than that processed to make the ID or the password invisible in the displayed processed image but does not receive a remote work instruction for the part processed to make the ID or the password invisible. This prevents the problem in which for example, the ID or the password is remotely instructed to be made visible from occurring. In other words, the security is tightened by not interfering in the part processed to make the ID or the password invisible.

The detection unit detects the character string "ID" or "password" contained in the image, and then the processing unit processes the image to make the characters around the character string invisible if an ID or a password is detected. Generally, in the management of IDs or passwords, a determined ID or password is often shown on the left, right, top, or bottom of the character string "ID" or "password." Based on this, the ID or the password is invisible as shown in FIG. 1 by processing the image to make the characters around the character string "ID" or "password" invisible. The character string "ID" or "password" may also be made invisible at the same time. This enables a remote work instructor to hardly guess that the invisible part contains an ID or a password.

Process Behavior

The method for remotely supporting work will be described below. The method for remotely supporting work displays the image on a terminal for remotely instructing work after processed to make an ID and a password invisible when the image shared between a user terminal and the terminal for remotely instructing work contains an ID and a password.

The method for supporting remote at least includes a detection step, a processing step, a display step, and a receiving step.

In the detection step, the above-mentioned detection unit detects an ID or a password contained in the image when an image taken by a user terminal is shared between the user terminal and a terminal for remotely instructing work to remotely support work. To detect an ID or a password contained in the image, OCR may be used. Alternatively, the IDs or passwords detected in the past may be mechanically learned as teacher data to detect an ID or a password contained in the image. The accuracy of detection improves by the machine learning.

In the processing step, the above-mentioned processing unit processes the image to make the ID and the password invisible if an ID or a password is detected. For example, the processing means tessellating, blackening, or masking the image with a stamp.

In the processing step, the above-mentioned processing unit may specify the position displaying the ID or the password contained in the image and may process only the part of the image that corresponds to the position to make the ID or the password invisible, if an ID or a password is detected (masking). Specifically, since only the part of the ID or the password is made invisible but the other parts are visible, it is easier to remotely instruct work than if the entire image is made invisible. Furthermore, since the parts other than the ID or the password are visible, the situation can be known to remotely instruct work easily. For example, only the part of the ID or the password is made invisible as shown in FIG. 1. The character string "ID" or "password" may also be made invisible at the same time.

Alternatively, in the processing step, the above-mentioned processing unit may not specify the position displaying the ID or the password contained in the image and may process the entire image to make the ID or the password invisible, if an ID or a password is detected (masking). In this case, since the entire image is invisible, the security can be more tightened than the case where only the part of the ID or the password is invisible, even if the processing partly fails. Furthermore, even if the position of the ID or the password is failed to be specified, the leak of information is prevented because the entire image is invisible.

In the display step, the above-mentioned display unit displays the processed image on the terminal for remotely instructing work. The display unit may display that the image has been processed. This enables a remote work instructor who uses the terminal for remotely instructing work to recognize that the displayed image has been processed. As the result, the remote work instructor easily instructs remote work. Furthermore, if the aspect ratio of the screen of the user terminal is different from that of the terminal for remotely instructing work as shown in FIG. 1, the image may be displayed on the terminal for remotely instructing work to maintain the aspect ratio of the image taken by the user terminal (for example, by displaying the part enclosed with a broken line on the terminal for remotely instructing work as shown in FIG. 1).

In the receiving step, the above-mentioned receiving unit receives a remote work instruction for the displayed processed image from the terminal for remotely instructing work. The remote work instructor can input a remote work instruction for the user from the terminal for remotely instructing work to the user terminal. The remote work instruction is necessary for work from a remote place, for example, by drawing and displaying a red circle in the image to tell the machine to be operated, by displaying a cubic arrow icon to tell the correct imaging direction, or appropriately changing and displaying to tell the progress of work.

In the receiving step, the above-mentioned receiving unit receives a remote work instruction for the part other than that processed to make the ID or the password invisible in the displayed processed image but does not receive a remote work instruction for the part processed to make the ID or the password invisible. This prevents the problem in which for example, the ID or the password is remotely instructed to be made visible from occurring. In other words, the security is tightened by not interfering in the part processed to make the ID or the password invisible.

In the detection step, the above-mentioned detection unit detects the character string "ID" or "password" contained in the image, and then the processing unit processes the image to make the characters around the character string invisible if an ID or a password is detected. Generally, in the management of IDs or passwords, a determined ID or password is often shown on the left, right, top, or bottom of the character string "ID" or "password." Based on this, the ID or the password is invisible as shown in FIG. 1 by processing the image to make the characters around the character string "ID" or "password" invisible. The character string "ID" or "password" may also be made invisible at the same time. This enables a remote work instructor to hardly guess that the invisible part contains an ID or a password.

To achieve the means and the functions that are described above, a computer (including a CPU, an information processor, and various terminals) reads and executes a predetermined program. For example, the program may be an application installed in a computer, may be provided through Software as a Service (SaaS), specifically, from a computer through a network, or may be provided in the form recorded in a computer-readable medium such as a flexible disk, CD (e.g., CD-ROM), or DVD (e.g., DVD-ROM, DVD-RAM). In this case, a computer reads a program from the record medium, forwards and stores the program to and in an internal or an external storage, and executes it. The program may be previously recorded in, for example, a storage (record medium) such as a magnetic disk, an optical disk, or a magnetic optical disk and provided from the storage to a computer through a communication line.

As the specific algorithm of the above-mentioned machine learning, the nearest neighbor algorithm, the naive Bayes algorithm, the decision tree, and the support vector machine, etc. may be used. Furthermore, the machine learning may be the deep learning that generates the feature amount for learning by using the neural network.

The embodiments of the present invention are described above. However, the present invention is not limited to the above-mentioned embodiments. The effect described in the embodiments of the present invention is only the most preferable effect produced from the present invention. The effects of the present invention are not limited to those described in the embodiments of the present invention.

What is claimed is:

1. A system for remotely supporting work, comprising:
   memory storing one or more instructions executed by a processor of the user terminal that:
   displays an image taken by the user terminal;
   mechanically learns IDs or passwords detected in the past as teacher data and detects an identifier (ID) and a password contained in the image taken by the user terminal using the teacher data;
   detects character strings "ID" and "password" contained in the image and processes the image to make characters around the detected character strings, including the ID and the password, invisible when the ID and the password are detected, wherein processing the image includes tessellating, blackening or masking with a stamp the characters around the detected character strings, including the ID and password, while leaving other remaining characters of the image visible;
   shares the processed image between the user terminal and a terminal for remotely instructing work by displaying the processed image on the terminal for remotely instructing work while displaying the image on the user terminal,
   wherein the processor receives a remote work instruction from the terminal for remotely instructing work while the processor is sharing the processed image with the terminal for remotely instructing work, wherein the processed image includes a first area and a second area displayed on the terminal for remotely instructing work, and the remote work instruction comprises one or more instructions for changing or displaying work on the first area of the processed image displayed in the terminal for remotely instructing work, wherein the second area is an area in which the ID and the password have been made invisible on the image, and the first area is an area other than the second area, and
   wherein the ID and password are protected from leakage by preventing the processor from receiving one or more instructions in the remote work instruction to make the ID and password in the second area, in which the ID and password have been made invisible, visible on the terminal for remotely instructing work.

2. The system according to claim 1, wherein the processor further detects the ID and the password contained in the image by using optical character recognition (OCR).

3. The system according to claim 1, wherein the processor further specifies a position displaying the ID and the password contained in the image and processing the image further comprises processing only an area of the image that corresponds to the position to make the ID and the password invisible, when the ID and the password are detected.

4. A method for remotely supporting work by a user terminal comprising a processor, the method comprising executing by the processor:
   displaying an image taken by the user terminal;

mechanically learning IDs or passwords detected in the past as teacher data and detecting an identifier (ID) and a password contained in the image taken by the user terminal using the teacher data;

detecting character strings "ID" and "password" contained in the image and processing the image to make characters around the detected character strings, including the ID and the password, invisible when the ID and the password are detected, wherein processing the image includes tessellating, blackening or masking with a stamp the characters around the detected character strings, including the ID and password, while leaving other remaining characters of the image visible;

sharing the processed image between the user terminal and a terminal for remotely instructing work by displaying the processed image on the terminal for remotely instructing work while displaying the image on the user terminal; and receiving a remote work instruction from the terminal for remotely instructing work while sharing the processed image with the terminal for remotely instructing work, wherein the processed image includes a first area and a second area displayed on the terminal for remotely instructing work, and the remote work instruction comprises one or more instructions for changing or displaying work on the first area of the processed image displayed in the terminal for remotely instructing work, wherein the second area is an area in which the ID and the password have been made invisible on the image, and the first area is an area other than the second area, and wherein the ID and password are protected from leakage by preventing the processor from receiving one or more instructions in the remote work instruction to make the ID and password in the second area, in which the ID and password have been made invisible, visible on the terminal for remotely instructing work.

5. A computer program product for use in a computer, the computer program product comprising a non-transitory computer usable medium having a set of instructions physically embodied therein, the set of instructions including computer readable program code, which when executed by a user terminal causes a processor to execute:

displaying an image taken by the user terminal;

mechanically learning IDs or passwords detected in the past as teacher data and detecting an identifier (ID) and a password contained in the image taken by the user terminal using the teacher data;

detecting character strings "ID" or "password" contained in the image and processing the image to make characters around the detected character strings, including the ID and the password, invisible when the ID and the password are detected, wherein processing the image includes tessellating, blackening or masking with a stamp the characters around the detected character strings, including the ID and password, while leaving other remaining characters of the image visible;

sharing the processed image between the user terminal and a terminal for remotely instructing work by displaying the processed image on the terminal for remotely instructing work while displaying the image on the user terminal, receiving a remote work instruction from the terminal for remotely instructing work while sharing the processed image with the terminal for remotely instructing work, wherein the processed image includes a first area and a second area displayed on the terminal for remotely instructing work, and the remote work instruction comprises one or more instructions for changing or displaying work on the first area of the processed image displayed in the terminal for remotely instructing work, wherein the second area is an area in which the ID and the password have been made invisible on the image, and the first area is an area other than the second area, and wherein the ID and password are protected from leakage by preventing the processor from receiving one or more instructions in the remote work instruction to make the ID and password in the second area, in which the ID and password have been made invisible, visible on the terminal for remotely instructing work.

* * * * *